United States Patent [19]

Soderberg

[11] Patent Number: 5,385,951
[45] Date of Patent: Jan. 31, 1995

[54] PROCESSES FOR PRODUCING FOAMABLE PARTS

[75] Inventor: Jan R. Soderberg, Overijse, Belgium

[73] Assignee: Exxon Chemical Patents Inc., Linden, N.J.

[21] Appl. No.: 983,581

[22] PCT Filed: Aug. 8, 1991

[86] PCT No.: PCT/EP91/01520
  § 371 Date: Apr. 5, 1993
  § 102(e) Date: Apr. 5, 1993

[87] PCT Pub. No.: WO92/02574
  PCT Pub. Date: Feb. 2, 1992

[30] Foreign Application Priority Data
  Aug. 8, 1990 [GB] United Kingdom ............... 9017405
  Jan. 29, 1991 [GB] United Kingdom ............... 9101934

[51] Int. Cl.$^6$ ............................ B29C 67/22; C08J 9/06
[52] U.S. Cl. ........................................ 521/98; 521/79;
  521/94; 264/51; 264/54; 264/46.6; 296/188
[58] Field of Search .................... 264/51, 54, 46.6;
  524/474; 523/352, 222; 525/222; 296/188, 189,
  211; 521/79, 94, 98

[56] References Cited

U.S. PATENT DOCUMENTS

| | | | |
|---|---|---|---|
| 3,608,006 | 9/1971 | Hosoda et al. | 264/46.3 |
| 3,987,134 | 10/1976 | Shiina et al. | 264/45.4 |
| 4,434,261 | 2/1984 | Brugel et al. | 156/327 |
| 4,673,620 | 6/1987 | Shulman et al. | 428/379 |
| 4,774,277 | 9/1988 | Janac et al. | 524/474 |
| 4,898,630 | 2/1990 | Kitoh et al. | 156/79 |
| 4,981,630 | 1/1991 | Botsolas et al. | 264/45.5 |
| 5,049,327 | 9/1991 | Hara et al. | 264/45.5 |
| 5,160,465 | 11/1992 | Soderberg | 264/54 |

FOREIGN PATENT DOCUMENTS

| | | |
|---|---|---|
| 0383498 | 8/1990 | European Pat. Off. |
| 1281489 | 7/1972 | United Kingdom . |
| 1590294 | 5/1981 | United Kingdom . |

OTHER PUBLICATIONS

Dialog accession No. 01424904, Furukawa Electric Co.: "Core–Sheath Foamable Polyethylene Pellets Prepn. by Extruding and Heating in the Mould" JP 49090364, A, 740829, 7545 (Basic) (Aug. 1974).

Patent Abstracts of Japan, vol. 11, No. 206, C433, abstract of JP 62-30132 publsihed 1987-02-09 (Toyoda Gosei Co., Ltd.).

*Primary Examiner*—Allan R. Kuhns
*Attorney, Agent, or Firm*—M. J. Dew; D. W. Miller

[57] ABSTRACT

A process for producing shaped foamable parts from a polymer composition containing polymer and a foaming and curing additive package which includes the steps of:

(a) dry blending at least the blowing agent part of the foaming and curing additive package of the composition with a wax powder to produce a dry blend;

(b) melt blending the dry blend and any residual parts of the composition at a temperature between the melting point and not more than 10° C., preferably not more than 5° C., above the melting point using a low shear condition to produce a melt blend;

(c) molding the melt blend within the temperature and shear conditions of step (b).

Foamable parts having good foam characteristics can be made on an industrial scale. The closed-foam cells are even. The foam adheres to metal surfaces.

8 Claims, No Drawings

PROCESSES FOR PRODUCING FOAMABLE PARTS

FIELD OF INVENTION

The invention relates to processes for producing shaped foamable parts. The invention involves an improvement of the invention described in European Patent Application 89301406.6 (U.S. application Ser. No. 478,798 dated Feb. 13, 1989). The invention is particularly useful for making components for inserting into car bodies for blocking moisture or sound transmission in hollow cavities or in gaps between car components.

BACKGROUND OF THE INVENTION

The prior art referred to in the earlier Application is pertinent here also.

In order to permit industrial scale application, a foamable composition should be blendable and formable into processable material or parts on industrial scale equipment and retain a suitable foam structure during processing a vehicle on a production line.

SUMMARY OF THE INVENTION

The invention provides in a broad aspect a process for producing foamable pellets from a polymer composition containing polymer and a foaming and curative additive package which includes the steps of:

(a) dry blending at least the blowing agent part of a foaming and curing additive package with a wax powder to produce a dry blend; and (b) melt blending the dry blend and polymer and any residual parts of the foaming and curing additive package at a temperature between the melting point and not more than 10° C., preferably not more than 5° C., above the melting point using a low shear condition to-produce a melt blend; and (c) pelletizing the melt blend.

Suitably the pellets may be formed into shaped foamable parts by:

(d) molding the pellets of the melt blend within the temperature and shear conditions of step (b) e.g. by injection molding, extruding or compression molding the melt blend material.

In a more particular aspect the invention provides a process for producing shaped foamable parts from a polymer composition containing polymer and a foaming and curing additive package which includes the steps of:

(a) dry blending at least the blowing agent part of the foaming and curing additive package of the composition with a wax powder to produce a dry blend;

(b) melt blending the dry blend and any residual parts of the composition at a temperature between the melting point and not more than 10° C., preferably not more than 5° C., above the melting point using a low shear condition to produce a melt blend;

(c) injection moulding the melt blend within the temperature and shear conditions of step (b).

The wax aids dispersion of the additive package and reduces shear resistance and hence local heating which might cause premature foaming. The wax may be cross-linked into the polymer matrix during foaming and so it is believed that it does not tend to migrate to the surface and reduce adhesion. The wax can be selected to have a low drop melting point, preferably of from 32° to 90° C.

The uniform additive dispersion and avoidance of local heating permits a relatively high melting point polymer to be foamed and cross-linked by a relatively mild curing step whilst the ingredients can still be blended and optionally additionally moulded in melt-form without triggering premature foaming.

The dry-blending needs to be performed with appropriately selected additives. The initial wax enhanced dry-blending step preferably also involves a blowing agent activator so that both blowing agent and activator are optimally dispersed.

The activator may be part of a proprietary blowing agent formulation or may be added separately from the blowing agent. References herein to the amount of blowing agent are to the combined amount of blowing agent and activator in a proprietary formulation used as starting material for the dry blending step.

Depending on the nature of the subsequent melt blending step, the additional additives used may include small amounts of paraffin preferably less than 1.5 wt %, especially less than 1 wt % to stick the wax powder to the blowing agent powder. This is particularly advantageous where a dry blended mixture is prepared for a one-feed melt blending step, which step then involves the simultaneous feeding of polymer pellet and blowing agent powder. The term dry-blending is used herein to include the blending also of small amounts of non-powderous components. The dry-blending may be performed with the additives only, without polymer pellets where polymer pellets are fed separately in a multiple-feed melt blending operation.

The polymer may be any suitable foamable polymer such as copolymer of ethylene and an ethylenically unsaturated ester.

Preferably the polymer includes at least 50 wt % of a polymer of ethylene and an acrylic acid ester of a $C_1$–$C_6$ alcohol and is preferably methyl acrylate. Advantageously the polymer consists essentially of the polymer of ethylene and acrylic acid ester, has an melt index MI of from 0.2 to 2 preferably up to 1 and contains from 12 to 18 weight percent of ester derived units. The use of EMA is preferred in view of its melting point, foaming characteristics and thermal stability. A moderate to high ester content helps to provide adhesion in the foamed, cross-linked condition. Suitably the polymer has a melting point of from 80° to 100° C., preferably from 85° to 95° C.

The selection of methyl acrylate seems particularly advantageous for the intended end-use, where heat stability without foaming and curing during blending and shaping must be combined with an expansion in adhesive condition at elevated curing temperature, maintained for a prolonged period. Using EMA as opposed to known EVA in a blend with a foaming/curing package as described provides an increasing melt strength due to curing simultaneously with and/or subsequent to foaming while surface adhesion is preserved for adhering the part to the metal surface. The foam is thermally stable and stable in form, does not cause corrosion, or undesirable odour, gives good adhesion to anti-corrosive coatings whilst brittleness is avoided even after prolonged heat treatment. Using EMA alone, as a copolymer component, facilitates homogeneous blending and foaming. The part in its unfoamed state does not contaminate products such as aqueous electrophoretic treatment both used for anti-corrosion treatment. No specialized equipment is necessary in vehicle production. The EMA may provide a higher melt strength at elevated temperatures so aiding form stability. When melt blending shear rates should be around 200 seconds$^{-1}$ down to 100 seconds$^{-1}$. In industrial equipment the shear rates vary inside the units and can be controlled and brought to a sufficiently low level by selecting the type and number of kneading blocks, the length of the screws, the screw speed (around 75 r.p.m. or as low as the drive can sustain) and as needed to keep the shear rate within the aforementioned preferred range. Single or twin screw installations may be used, or batch melt blending equipment. If desired the melt blending may be repeated to further improve additive dispersion.

The blending procedure leads to a very fine division and dispersion of additives. Foaming can be triggered in a reliable way, for example above 100° to 120° C., giving rise to relatively even, small foam-cells. The curing agent can commence its cross-linking at from 140° to 170° C. aiding retention of shape of the expanded foam in later car processing stages.

Advantageously the wax is an amorphous, soft wax, preferably having a drop point below 90° C. and especially from 80° to 85° C. and/or the wax is used in an amount of from 0.2 to 5 wt % (preferably from 0.5 to 3 wt %) on the weight of the overall composition. The soft wax may be an ethylene-isobutylene derived polymer which provides a compound which can be ground into powder and will, in powder form, dry-blend with other powder-like materials. However because the powder has a low drop point it will melt blend readily in the melt blending at low temperature and low shear conditions whilst aiding in the additive package dispersion. Advantageously the wax has a drop point temperature below that of the polymer preferably below 90° C., so that the polymer can be melt-blended at a minimum temperature. It is believed that under such conditions the blowing agent etc. may be coated with the molten wax before entering the polymer phase so improving homogeneous dispersion. It is preferable to use solid, relatively high molecular weight materials to improve compatibility and ease of cross-linking. The particle size is preferably below 500 micronmeters, especially below 300 micronmeters. Advantageously the melt viscosity is from 1000 millipascals (mPas) to 500 millipascals at 121° C.

Preferably the foaming and curing additive package contains from 1 to 10 wt % of one or more blowing agents, from 1 to 10 wt % of one or more activators, and from 0.5 to 5 wt %, preferably from i to 3 wt % of one or more cross-linking agents, all percentages being on the basis of the weight of the overall composition. Suitably the additive package includes azodicarbonamide as blowing agent. The blowing agent may also include benzene sulfonyl hydrazide or p-toluene sulfonyl hydrazide for initial low temperature foaming. Such additional components may be added as convenient to achieve good blending and dispersion in the dry-blending and/or melt-blending step.

The curing agent may be used in conjunction with a co-agent such as triallyl cyanurate or phenylenedimaleimide to boast initial cross-linking.

The invention also provides a process for insulating compartments in a vehicle body against moisture and-/or sound transmission which includes the steps of: assembling a part made by a process as described previously in open space of a vehicle body so that the part is as for at least part of its surface in close proximity but spaced from a surrounding internal vehicle part surface; and submitting the body to a high temperature (preferably of from 130° C. to 180° C.) curing treatment under atmospheric pressure in conditions such that the part expands, contacts and adheres to the surrounding surfaces and forms a moisture and sound insulating seal of closed-cell foam in the compartment.

EXAMPLES

A foamable structure was produced of the following starting composition:

| | |
|---|---|
| Polymer<br>EMA XS 53.04<br>MI 0.7(*), MA 15 wt %,<br>Exxon Chemical | 92 wt % |
| Wax<br>Escomer TM 651 E | 1.4 wt % |
| Cross-linking agent | |
| Perkadox TM 14/40<br>bis/tert butylperoxy-<br>isopropyl/benzene | 1.5 wt % |
| Trigonox TM 29/40<br>4,4-di, tert butylperoxy<br>n-butyl valerate | 0.6 wt % |
| Activator<br>ZnO | 0.9 wt % |
| Blowing agent<br>Porofor TM ADC/K<br>azodicarbonamide<br>(contains 10% wt zincdibenzosulphonate<br>activator) | 2.7 wt % |
| Activator<br>TAC<br>triallyl cyanurate | 0.09 wt % |
| Processing liquid<br>liquid paraffin | 0.7 wt % |

(*)MI by ASTM D 1238 Condition E, 190° C. 2,16 load in g/10 min.

The Escomer wax 561 E is used as a powder. It has a melting point at 82°–83° C. The wax is rather amorphous containing ethylene-isobutylene copolymer but it can still be powdered.

The EMA, Perkadox, Trigonox, Escomer, ZnO, and Porofor were all dry-blended in a tumble blender.

The dry blend was supplied to a feed hopper of a Bautsano twin screw extruder having configuration 6, of 1222.5 mm length and with a minimum of kneading blocks.

The materials were fed at a feed rate of 4 kg/hour with a screw speed of 75 r.p.m. and a temperature at the die of from 80°–87° C.

Pellets produced by the extruder were injection moulded in a vigourously cooled mould, using a low screw speed and a low injection speed.

The objects made were foamable under more elevated temperature conditions. The foam was stable, adhesive and had small closed-cells and could be incorporated by in situ expansion in a vehicle body.

The expanded foams can have closed-cells even at their surface. Excessive cross-linking, which may lead to foam brittleness can be largely avoided.

Alternatively EMA, Perkadox and Trigonox could form a first dry blend; the Escomer, ZnO and Porofor a second dry blend. The blends could then be fed separately in a multiple feed blender machine for melt blending. No paraffin needs to be used in this case.

Using the above process, blowing agents active at temperatures upwards of 100° to 120° C can be processed so as:

(1) to permit polymer and foaming/curing package to be blended and shaped without foaming or curing;
(2) to allow the shaped composition to expand, using surrounding air and internally supplied heat from a relatively low surface area to volume ratio;
(3) to delay curing using suitably active cross-linking agents until after appreciable expansion has taken place so as to provide good adhesion at the surface;
(4) and to cure and retain the expanded shape in position without foam collapse during exposure at elevated temperatures without risk of metal corrosion.

The pellets may be used as such non-expanded or may be used by pre-expanding them at least partially and then adhering and/or additionally expanding them in position to provide the desired insulation. The adhesion may be effected by a wax such as a functionalized wax with reasonable metal adhesion of the type used for corrosion protection.

The moulding step may also involve simple extrusion or a compression moulding of the pellets at ambient or elevated temperature. The parts can then be incorporated into a vehicle body in the manner described in EP Application No. 89301406.6, published Aug. 22, 1990.

I claim:

1. A process for producing expandable parts from a composition, comprising the steps of:
   a) blending;
      (1) a blowing agent in the range of from about 1 to about 10 weight percent, based on the total weight of the composition;
      (2) a blowing agent activator in the range of from about 0.5 to 5 weight percent, based on the total weight of the composition;
      (3) a crosslinking agent in the range of from about 1 to about 3 weight percent, based on the total weight of the composition;
      (4) a wax in the range of from about 0.2 to 5 weight percent, based on the total weight of the blend said wax having a drop temperature not exceeding 90° C.; and
      (5) a paraffin up to about 1.5 weight percent based on the total weight of the composition.
   b) blending the product of step (a) with a copolymer of ethylene and methyl acrylate, said copolymer having a melt index (MI) in the range of from about 0.2 to about 2, said copolymer containing in the range of from about 12 to about 18 weight percent of methyl acrylate, said copolymer having a melting point in the range of from about 80° to about 100° C.;

2. A process for filling cavities with a foamable composition, comprising the steps of:
   a) blending;
      (1) a blowing agent in the range of from about 1 to about 10 weight percent, based on the total weight of the foamable composition;
      (2) a blowing agent activator in the range of from abut 0.5 to 5 weight percent, based on the total weight of the foamable composition;
      (3) a crosslinking agent in the range of from about 1 to about 3 weight percent, based on the total weight of the foamable composition;
      (4) a wax in the range of from about 0.2 to about 5 weight percent, based on the total weight of the foamable composition; and
      (5) a paraffin up to about 1.5 weight percent, based on the total weight of the foamable composition;
   b) blending the product of step (a) with a copolymer of ethylene and an acrylic acid ester, said copolymer having a melt index (MI) in the range of from about 0.2 to about 2, said copolymer containing in the range of from about 12 to about 18 weight percent of ester derived units, said copolymer having a melting point in the range of from about 80° to about 100° C.;
   c) heating the product of step (a) and step (b) to a temperature in the range of from about the melting point of the polymer to about 10° C. above the melting point of said polymer;
   d) shearing the product of step (a) and step (b) at a shear rate in the range of from about 100 seconds$^{-1}$ to about 200 seconds$^{-1}$;
   e) placing the blended, heated, sheared product into a cavity; and
   f) heating the product of step (e) to a temperature sufficient to cause foaming and crosslinking.

3. A process according to claim 2, wherein said cavity is defined by an interior wall, said blended, heated, sheared product is placed a spaced distance from said cavity interior wall.

4. A process according to claim 3 wherein said cavity is a vehicle body cavity.

5. A process according to claim 4 wherein the heating step of (f) further includes expansion of the foamable composition such that the foamable composition contacts and adheres to said wall.

6. A foamable object made from a process comprising the step of:
   a) blending a blowing agent, a blowing agent activator, a wax, a crosslinking agent, a paraffin, and a polymer, said polymer having a melting point in the range of from about 80° C. to about 100° C., said polymer being a copolymer of ethylene and an acrylic acid ester of a $C_1$-$C_6$ alcohol, said copolymer having a MI in the range of from about 0.2 to about 2, said copolymer having in the range of from about 12 to about 18 weight percent of ester derived units.

7. A foamable object according to claim 6, wherein
   a) said wax having a drop melting point in the range of from about 32 to about 90° C.
   b) said blowing agent is present in the range of from about 1 to about 10 weight percent, based on the total weight of the composition and wherein said blowing agent is azodecarbonamide;
   c) wherein said blowing agent activator is present in the range of from about 1 to about 10 weight percent, based on the total weight of the composition;
   d) wherein said paraffin is present up to about 1.5 weight percent and based on the total weight of the composition;
   e) wherein said crosslinking agent is present in the range of from about 0.5 to about 5 weight percent based on the total weight of the composition.

8. A vehicle body having cavity filled by a process, comprising the steps of:
   a) blending a blowing agent with a wax;
   b) blending the product of step (a) with a polymer at a temperature in the range of from about the melting point of said polymer to about 10° C. higher than said polymer melting point and at a shear rate in the range of from about 100 seconds$^{-1}$ to about 200 seconds$^{-1}$;
   c) placing the product of step (b) in an said vehicle body cavity; and
   d) heating said vehicle body to a temperature sufficient to initiate foaming and crosslinking of the product of step (b).

* * * * *